Figure 1:
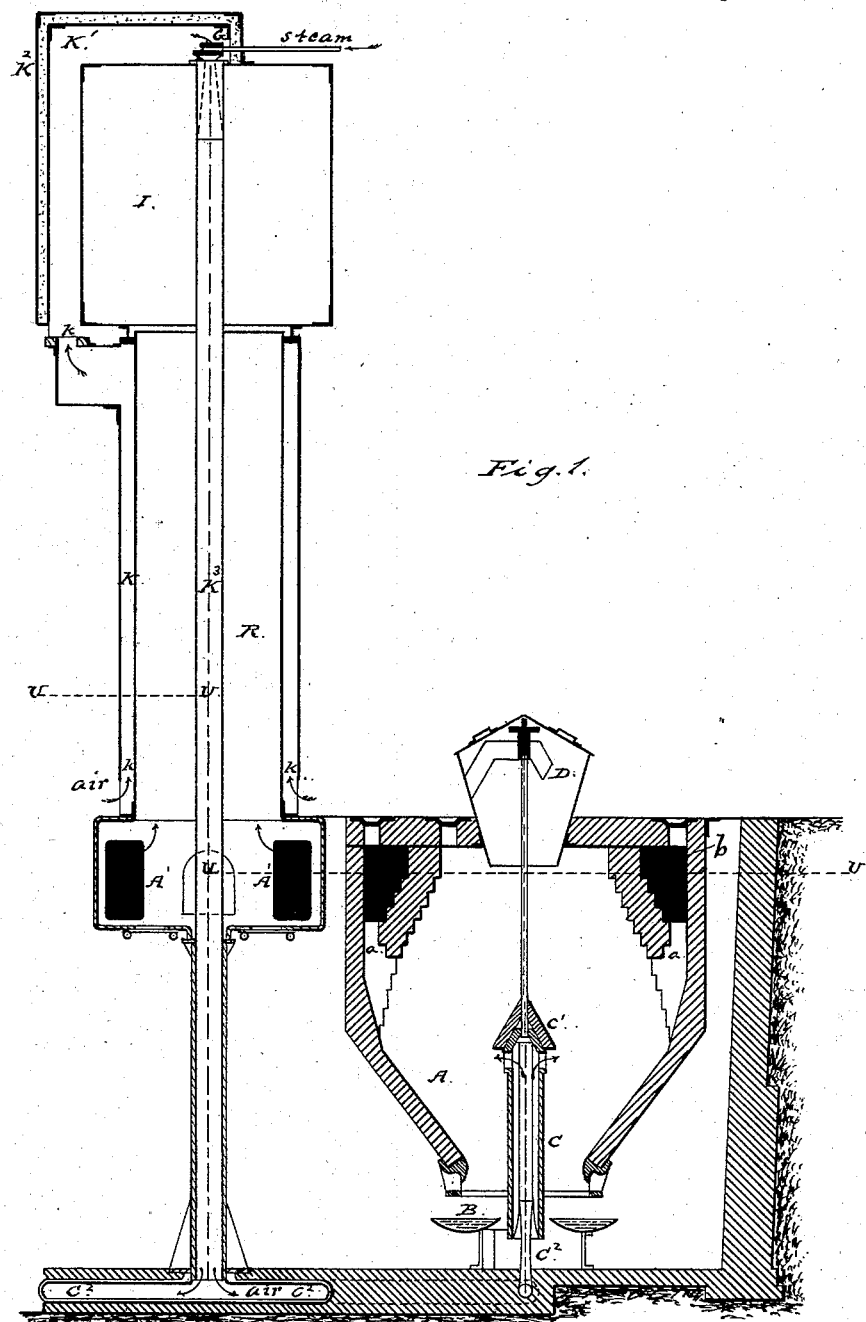

(No Model.)  3 Sheets—Sheet 1.

C. W. SIEMENS.
GAS PRODUCER.

No. 282,387.  Patented July 31, 1883.

Attest:
H. W. Howard
E. M. Fowler

Inventor:
C. W. Siemens
by C. Whitman
Atty.

(No Model.) 3 Sheets—Sheet 2.

C. W. SIEMENS.
GAS PRODUCER.

No. 282,387. Patented July 31, 1883.

(No Model.)  C. W. SIEMENS.  3 Sheets—Sheet 3.
GAS PRODUCER.
No. 282,387. Patented July 31, 1883.
Fig. 3
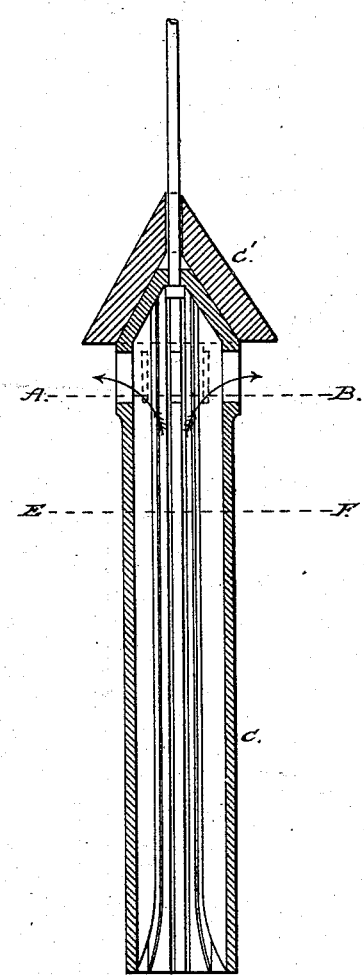
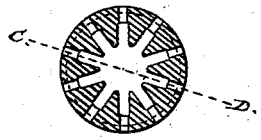
Attest;
F. W. Howard
Edw. H. Downs
Inventor;
C. W. Siemens
by C. S. Whitman
Attorney

UNITED STATES PATENT OFFICE.

CHARLES W. SIEMENS, OF WESTMINSTER, COUNTY OF MIDDLESEX, ENGLAND.

GAS-PRODUCER.

SPECIFICATION forming part of Letters Patent No. 282,387, dated July 31, 1883.

Application filed August 5, 1882. (No model.) Patented in England August 19, 1880, No. 3,374; in France January 31, 1881, No. 140,857; in Germany February 2, 1881, No. 16,223, and in Belgium February 24, 1881, No. 53,927.

*To all whom it may concern:*

Be it known that I, CHARLES WILLIAM SIEMENS, a subject of the Queen of Great Britain, residing at Westminster, in the county of Middlesex, England, have invented certain new and useful Improvements in Gas-Producers; and I do hereby declare the following to be a full, clear, and exact description of the invention, such as will enable others skilled in the art to which it appertains to make and use the same.

My invention relates to gas-producers; and it consists in the method hereinafter described of producing combustible gas by the action of air or of heated air under pressure, in some cases mingled with steam, introduced into the heart or body of the kindled fuel.

It also consists in utilizing the heat of the gas thus produced for heating the air supplied to the producer; and, finally, it consists in certain novel combinations of the parts of which the producer is composed.

In the producer constructed according to my invention solid fuel—such as coal, coke, anthracite, lignite, peat, and the like—is acted on by jets of air or of heated air, in some cases mingled with steam, under the influence of which the fuel is rapidly decomposed, its carbonaceous and hydrogenous constituents forming combustible gases with the constituents of the air and steam, while its earthy ingredients drop in a fused or partly fused condition through the openings in the bottom of the producer. The current of air is conducted upward into the producer in such a manner as to be discharged into the heart of the mass of fuel where the maximum heat is produced. The fuel in its descent from a hopper reaches gradually this region of maximum heat, having parted with all or most of its gaseous constituents. At the point of maximum heat the carbon is consumed, producing carbonic anhydride, which, in passing through considerable thickness of fuel surrounding this portion, takes up a second equivalent of carbon and becomes changed to carbonic oxide. Here, also, the earthy constituents are for the most part separated in a fused or semi-fused condition, and in descending gradually reach an orifice at the bottom of the producer, whence they are removed from time to time. Air enters the bottom orifice to some extent, causing the entire consumption of any carbonaceous matter which may have got past the zone of greatest heat. Water may also be introduced at the bottom orifice, which, after being evaporated, passes upward through the incandescent mass, and is converted by decomposition into carbonic oxide and hydrogen gas. The hydrocarbons formed in the upper portion of the apparatus have to descend through the hotter fuel below, and in so doing the tar and other vapors mixed up with them are decomposed, and furnish combustible gases of a permanent character.

Figure 2:
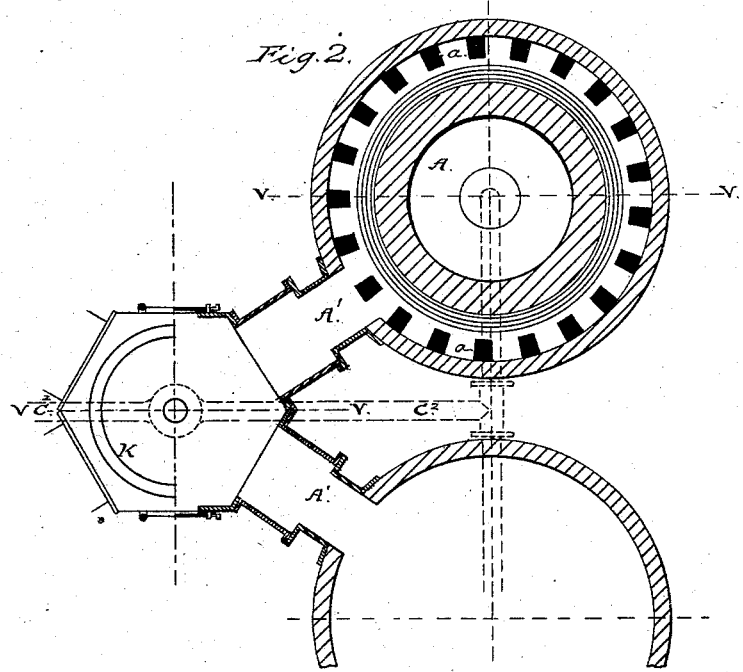

The apparatus which I prefer to use is illustrated in the accompanying drawings, in which Figure 1 is a part vertical section of a gas-producer with heated air supplied from below, taken on the lines V V of Fig. 2. Fig. 2 is a part plan of the same gas-producer, taken on the lines U U of Fig. 1. Fig. 3 represents the supply-pipes provided with internal ribs or fins.

Corresponding parts are denoted by the same letters in all the figures.

The producer A consists of a wrought-iron cylindrical chamber, the lower part of which is contracted in a conical form downward and lined with brick-work. It has at the bottom an opening, under which is placed a dish, B, to receive the cinder, which may be cooled by water supplied to the dish by a pipe with a stopcock. In the center of the producer is the air-supply pipe C, which may extend upward from the bottom, as shown in Fig. 1, and its end may be protected by refractory material C'. The pipe C itself should be of refractory material or metal—such as cast-steel—and may be provided with internal ribs or fins to present additional surface to the passing air, and to aid in cooling as well as to strengthen it. The fuel is supplied to the producer by a hopper, D, which has removable covers. The gas produced in A passes by numerous lateral channels into an annular space, $b$, and flue A', whence it is taken to the point required.

A producer constructed as above described may be arranged to operate in connection with a regenerative or other furnace, or a number of such producers may be arranged together for the supply of one or more furnaces.

In Figs. 1 and 2 is shown an arrangement of producers for supplying a vertical shaft, R, leading to a gas-main, I. For the purpose of heating the air conveyed by the pipes $C^2$ for supplying the producers, the ascending-gas shaft R is surrounded by a casing, K, up which air ascends, as indicated by the arrow $k$, to a space, K', above, which is protected against loss of heat by a covering of non-conducting material, $K^2$. From the space K' the air is directed by a steam-jet, G, down a central pipe, $K^3$, to supply the branches $C^2$, leading to the producer, the air being thus heated both in its ascent along the casing K and in its descent along the pipe $K^3$ by conduction from the ascending gas. The hot air from the pipe $C^2$ issues in a jet in the center of pipe C, drawing in around it an additional quantity of air, which also becomes heated as it rises up the pipe C, which may be made with internal fins to present additional heating-surface to the passing air and to aid in cooling the pipe C itself, as well as to strengthen it.

The current of air to supply the producer may be produced or accelerated by the injector action of a steam-jet, this jet being supplied from any convenient boiler, or from a boiler heated by the products of combustion from the furnace in which the gas is burned; or the current of air may be produced by any other known means.

Having thus described my invention, I claim and desire to secure by Letters Patent of the United States—

1. The process described of producing combustible gas by the action of heated air introduced from below into the heart or central portion of the body of the kindled fuel, and conducting the gas away for combustion.

2. The process herein described of producing combustible gas by the action of heated air mingled with steam introduced from below into the heart or central portion of the kindled fuel, and conducting the gas away for combustion.

3. The gas-producer A, having an opening, under which is placed an annular dish, B, to receive the cinder, in combination with the central pipe, C, as and for the purposes described.

4. The combination of the producer and the air-supply pipe C, extended upward from the bottom, and a gas-eduction pipe, as and for the purposes described.

5. The combination of the producer and the pipe C, which supplies air to the heart of the kindled fuel, and is provided with internal fins, as and for the purposes described.

6. The gas-producer A, having lateral channels $a$, and an annular space, $b$, in combination with the vertical shaft R, having flues A', as and for the purposes described.

7. The ascending-gas shaft R, casing K, space K', and covering of non-conducting material $K^2$, in combination with a gas-producer, as and for the purposes described.

8. The space K', in combination with an ascending-gas shaft having a casing and central pipe, $K^3$, provided with a steam-jet, G, and supply branches $C^2$, leading to the producers.

9. The combination of the ascending shaft R, casing K, and pipe $K^3$, whereby the air is heated in its ascent and descent by the heat of the produced gas.

C. W. SIEMENS.

Witnesses:
 E. F. BAMBER,
 G. W. TURNER.